(12) United States Patent
Ratner

(10) Patent No.: US 9,266,599 B1
(45) Date of Patent: Feb. 23, 2016

(54) APPARATUS TO LIFT AND FILL A BALLOON

(71) Applicant: Google Inc., Mountain View, CA (US)

(72) Inventor: Daniel Ratner, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/546,412

(22) Filed: Nov. 18, 2014

(51) Int. Cl.
*B64B 1/62* (2006.01)

(52) U.S. Cl.
CPC ........................... *B64B 1/62* (2013.01)

(58) Field of Classification Search
USPC ................ 244/98, 31; 446/220–226
See application file for complete search history.

(56) References Cited

U.S. PATENT DOCUMENTS

| | | | |
|---|---|---|---|
| 2,635,834 A | | 4/1953 | Huch |
| 2,764,369 A | | 9/1956 | Melton |
| 3,814,353 A | | 6/1974 | Nelson |
| 4,416,433 A | * | 11/1983 | Bellina .................. F21V 3/023 116/210 |
| 6,182,924 B1 | * | 2/2001 | Nott .......................... B64B 1/44 244/61 |
| 6,628,941 B2 | * | 9/2003 | Knoblach .......... H04B 7/18576 455/431 |
| 7,341,224 B1 | * | 3/2008 | Osann, Jr. ............. B64C 39/028 244/30 |
| 7,478,779 B2 | * | 1/2009 | Nguyen .................. F21V 3/023 244/24 |
| 7,568,656 B2 | * | 8/2009 | Handley .................... B64B 1/06 244/24 |
| 8,061,648 B2 | * | 11/2011 | Lachenmeier ........ B64C 39/024 244/33 |
| 8,505,847 B2 | * | 8/2013 | Ciampa ..................... B64B 1/62 244/24 |
| 8,814,084 B2 | * | 8/2014 | Shenhar ................. A63H 27/10 244/128 |
| 8,982,856 B2 | * | 3/2015 | Brownrigg ......... H04B 7/18584 370/338 |
| 8,998,128 B2 | * | 4/2015 | Ratner ...................... B64B 1/62 244/31 |
| 9,027,877 B1 | * | 5/2015 | Brookes .................... B64B 1/58 137/223 |
| 2010/0270425 A1 | * | 10/2010 | Zur .......................... B64B 1/40 244/33 |

* cited by examiner

Primary Examiner — Christopher P Ellis
(74) Attorney, Agent, or Firm — Lerner, David, Littenberg, Krumholz & Mentlik, LLP

(57) ABSTRACT

Aspects of the disclosure relate to filling and lifting high altitude balloons. For instance, one example system for lifting and filling a balloon having a balloon envelope includes an apparatus for use with the balloon envelope. The apparatus includes a load line, a fill tube having a hollow portion nested within the load line and a termination member attached to the fill tube and load line. The load line is configured to lift the balloon envelope during inflation. The fill tube extends through the load line and is configured to allow lift gas to pass through the hollow portion. The termination member is configured to mate with an opening in the balloon envelope so that lift gas can pass through the hollow portion of the fill tube and into the opening in the balloon envelope.

20 Claims, 9 Drawing Sheets

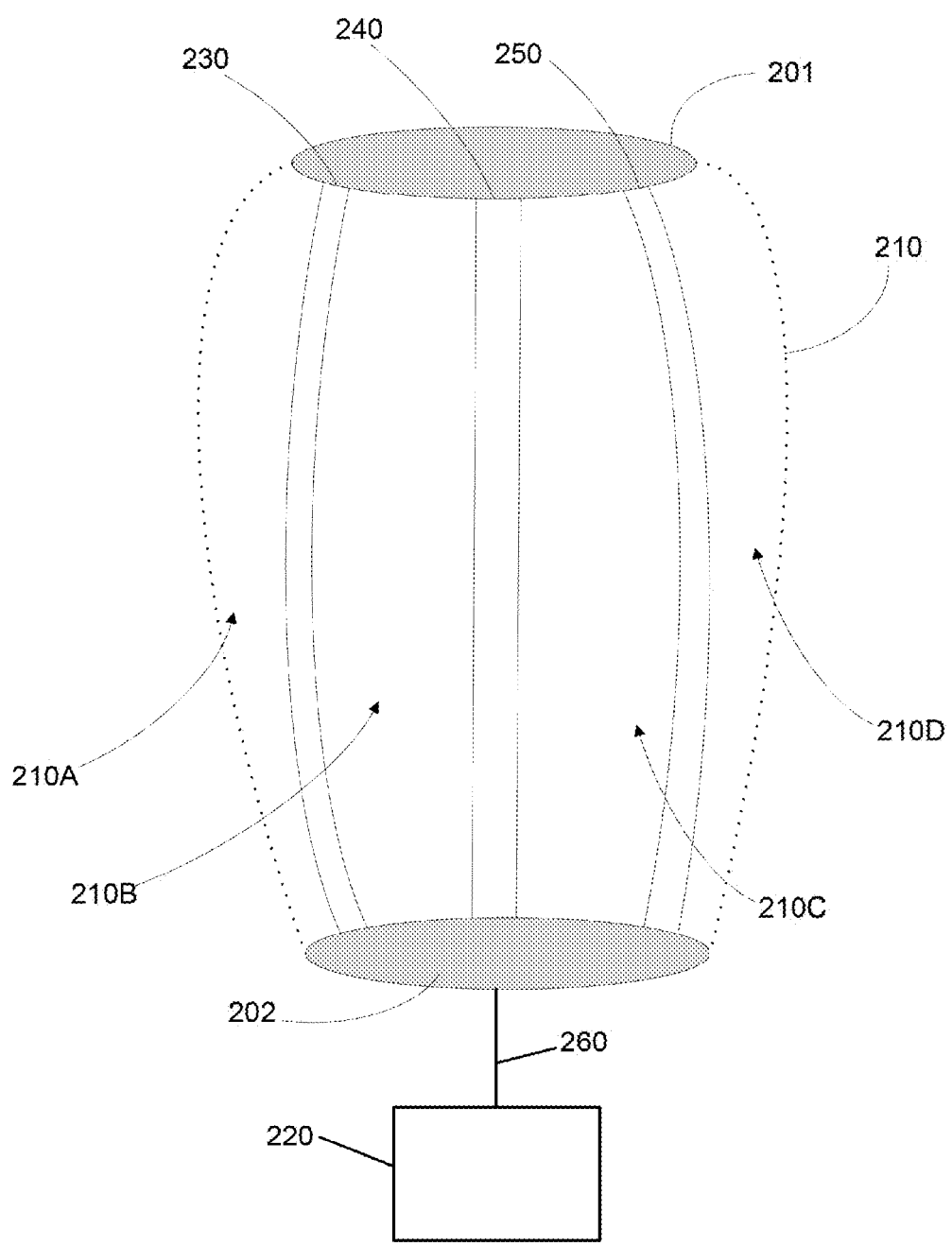

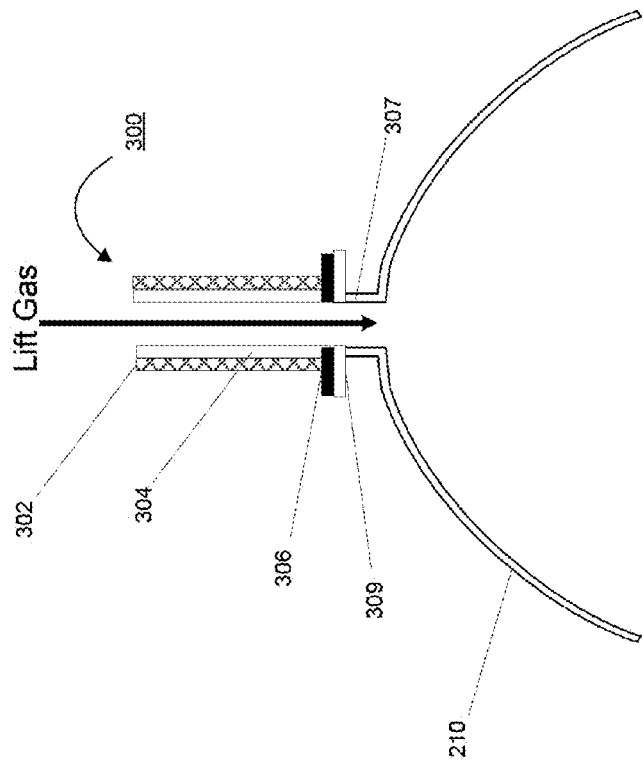
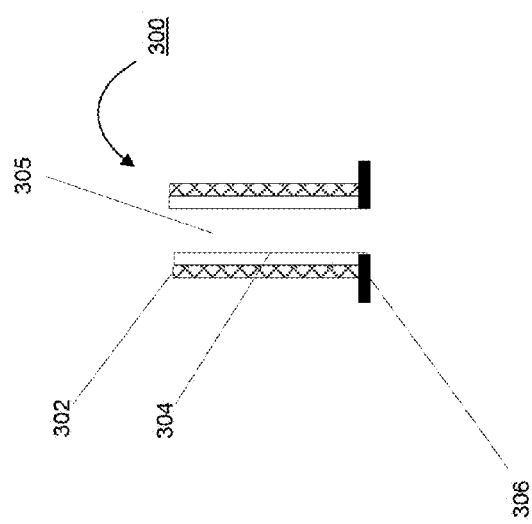

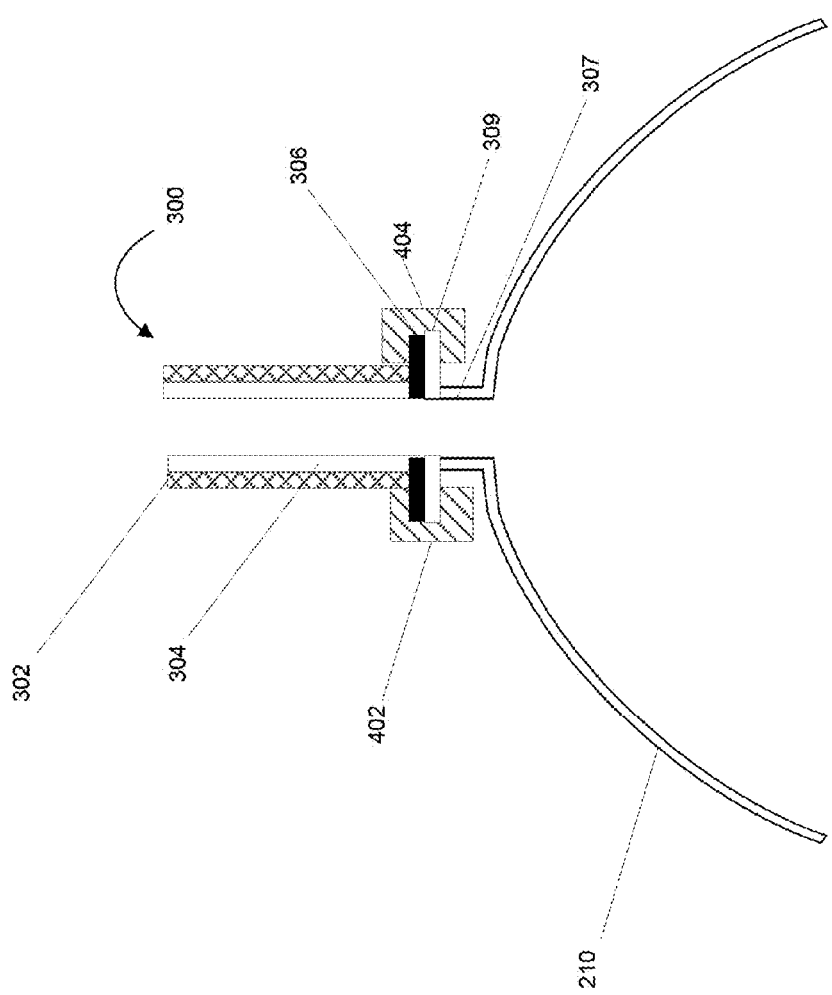

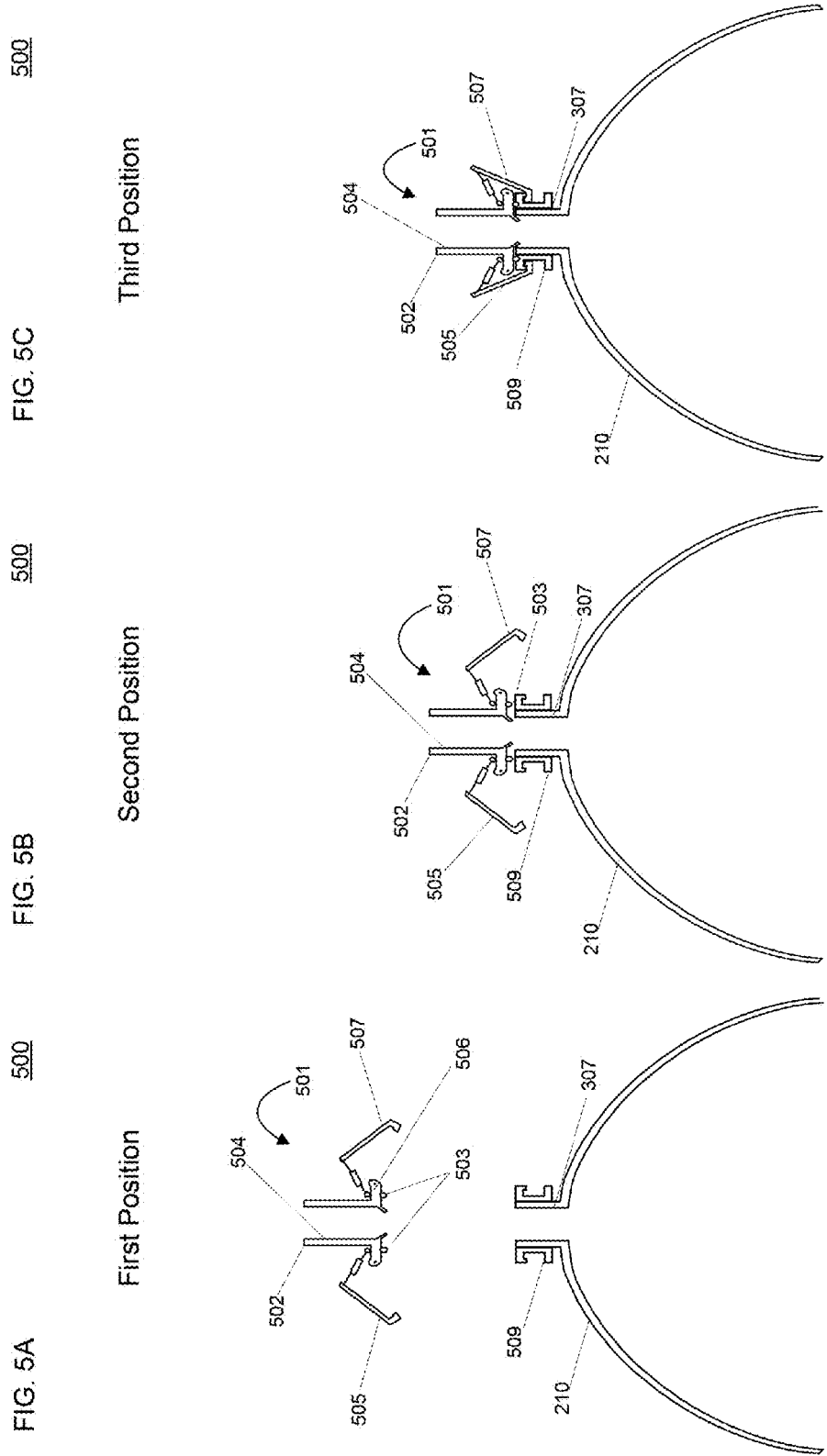

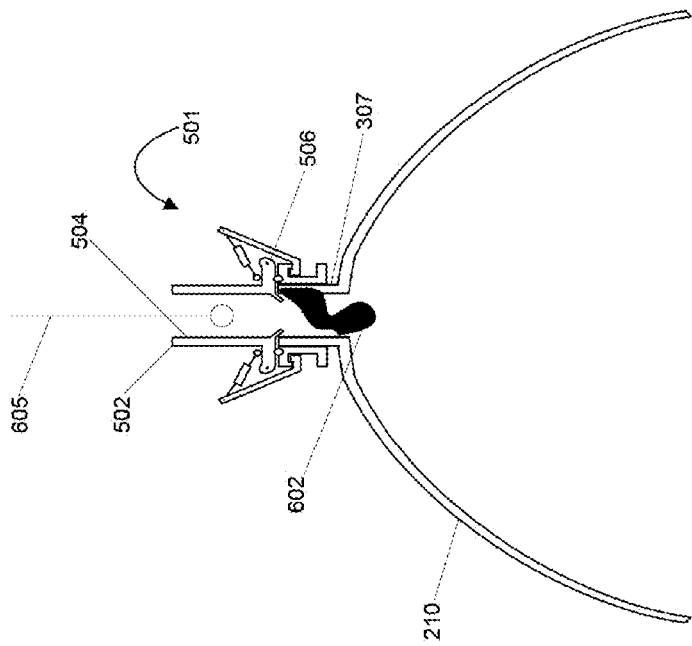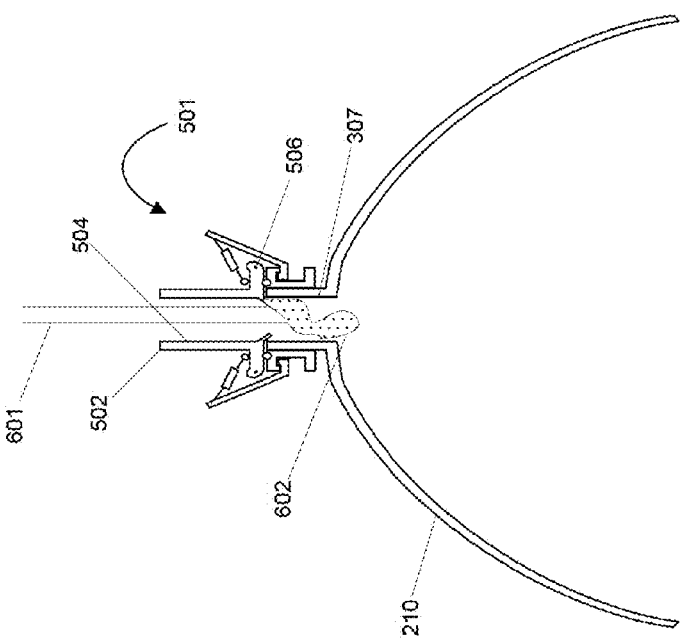

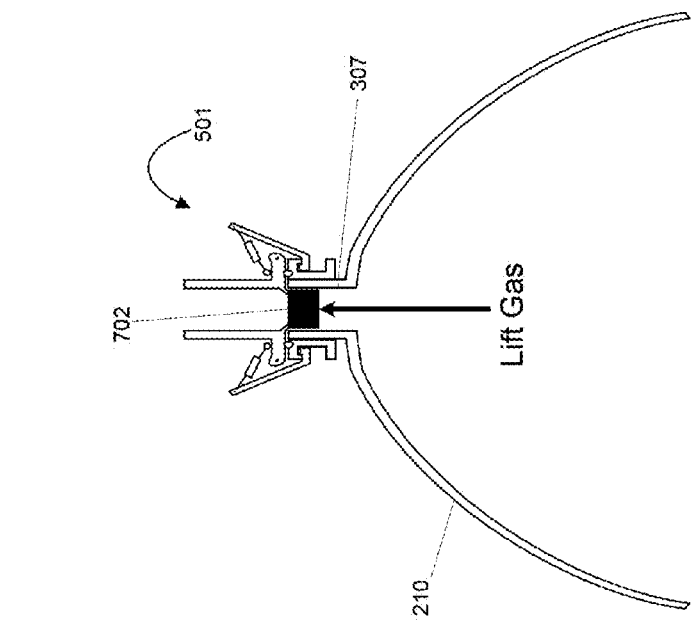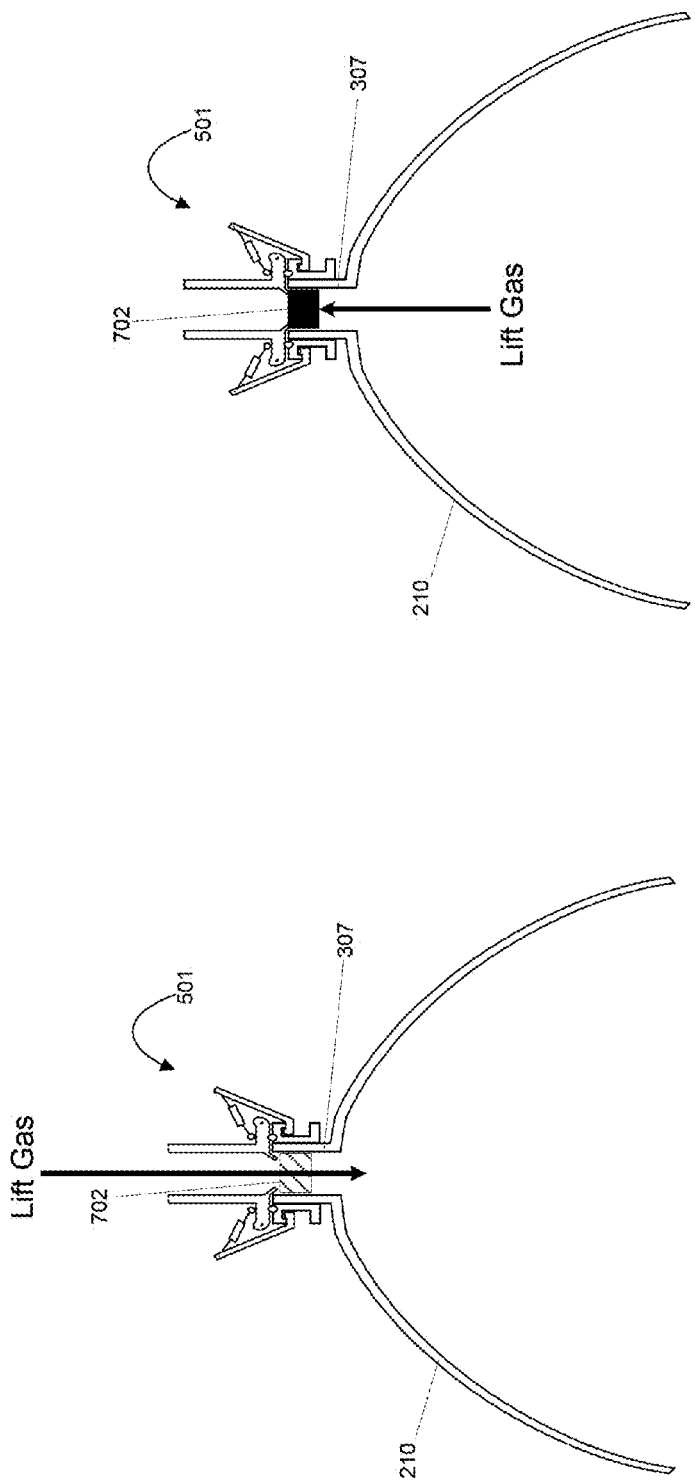

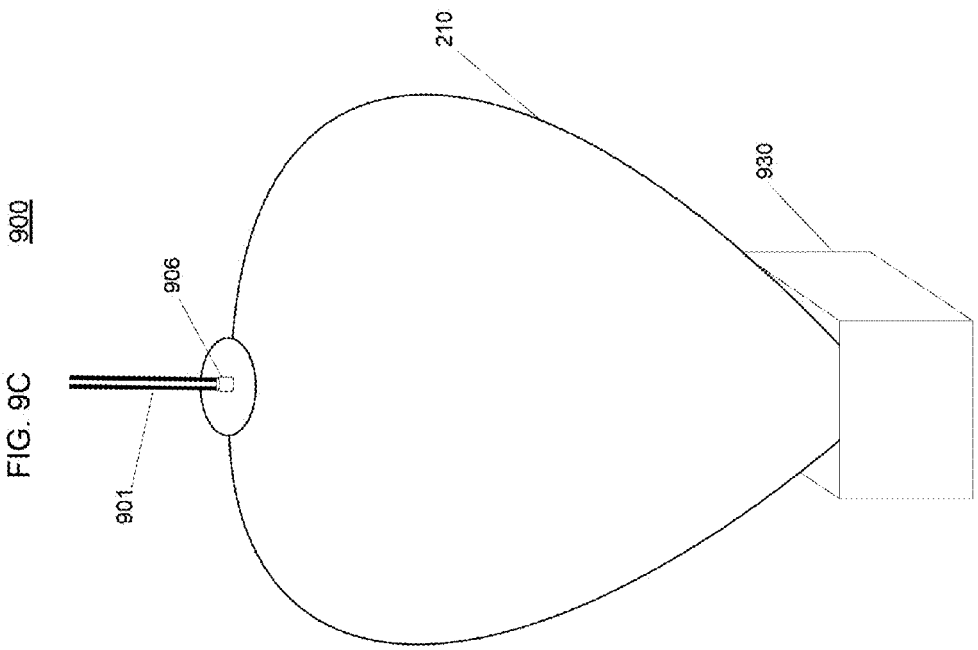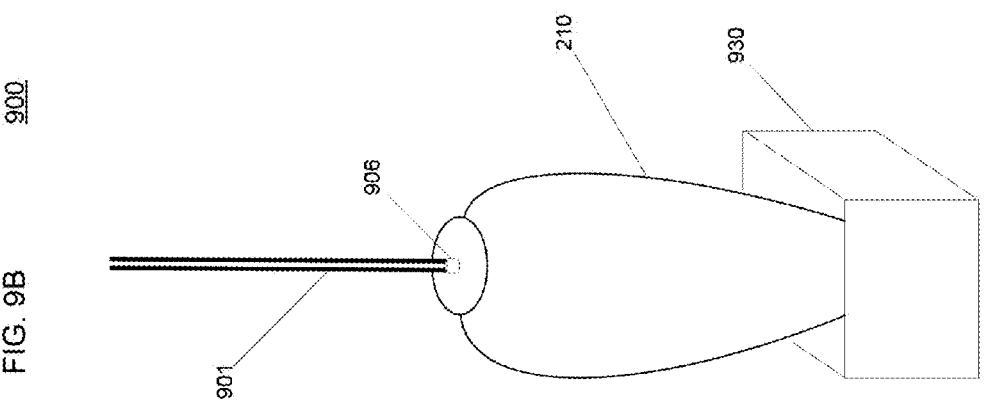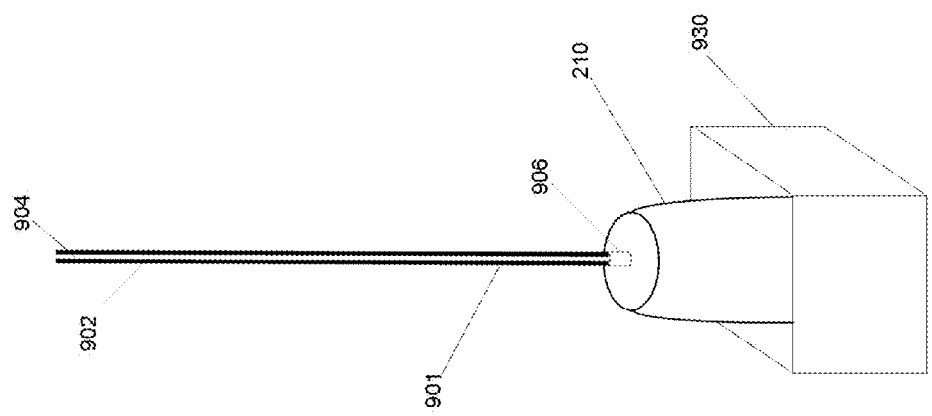

APPARATUS TO LIFT AND FILL A BALLOON

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

Before a balloon can be deployed, the balloon envelope must be inflated with lighter than air lift gases, such as helium, hydrogen or other types of gases. As an example, an interface, such as a small fill tube, attached to a top plate on the balloon may be coupled to a filling hose for filling the envelope with gas. However, when the filling hose is removed, the gas can escape from the balloon envelope. Furthermore, to lift the inflated balloon for deployment, a separate device may be required to be used that must be aligned with the balloon in a certain way in order to avoid damaging the fill tube.

BRIEF SUMMARY

Aspects of the present disclosure are advantageous for providing techniques for lifting and filling a balloon having a balloon envelope. In one aspect, a system is provided that includes an apparatus for use with the balloon envelope. The apparatus may include a load line, a fill tube having a hollow portion nested within the load line and a termination member attached to the fill tube and load line. The load line may be configured to lift the balloon envelope during inflation. The fill tube may extend through the load line and can be configured to allow lift gas to pass through the hollow portion. The termination member may be configured to mate with an opening in the balloon envelope so that lift gas can pass through the hollow portion of the fill tube and into the opening in the balloon envelope.

In one example, one or more actuators may be coupled to the termination member. The one or more actuators are configured to temporarily hold the termination member and the opening in the balloon envelope together. These actuators may include at least one of a magnet, servo, hydraulic and motorized double-CAM lock. In some examples, the actuators may include an arm portion configured to pull the termination member onto the opening in the balloon envelope in order to firmly secure the termination member and the opening together.

In another example, a plugging device may be attached to the opening in the balloon envelope. The plugging device may be configured to regulate a flow of lift gas through the opening. In one embodiment, the plugging device may includes a gasket configured to move from a first position to allow lift gas to enter the opening in the balloon envelope and second position to prevent the lift gas from escaping through the opening in the balloon envelope. In another embodiment, the plugging device may include an epoxy injected through the hollow portion of the fill tube. The epoxy may be configured to harden in order to close the opening in the balloon envelope. In that regard, a light source may be disposed through the hollow portion of the fill tube. The light source may be configured to activate hardening of the epoxy. In yet another embodiment, the plugging device may include a plug configured to close the opening in the balloon envelope.

In another aspect, an apparatus for use with the balloon envelope is provided. The apparatus may include a load line, a fill tube having a hollow portion nested within the load line and a termination member attached to the fill tube and load line. The load line may be configured to lift the balloon envelope during inflation. The fill tube may extend through the load line and can be configured to allow lift gas to pass through the hollow portion. The termination member may be configured to mate with an opening in the balloon envelope so that lift gas can pass through the hollow portion of the fill tube and into the opening in the balloon envelope.

BRIEF DESCRIPTION OF THE DRAWINGS

FIG. 2 is an example of a balloon in accordance with aspects of the present disclosure.

FIGS. 3A-3B are cut-away side views of an apparatus in accordance with aspects of the present disclosure.

FIG. 4 is another example cut-away side view of the apparatus of FIGS. 3A-3B in accordance with aspects of the present disclosure.

FIGS. 5A-5C are cut-away side views of another example of an apparatus in accordance with aspects of the present disclosure.

FIGS. 6A-6B are examples of a plugging technique in accordance with aspects of the present disclosure.

FIGS. 7A-7B are another example of a plugging technique in accordance with aspects of the present disclosure.

FIGS. 9A-9C are examples of an apparatus lifting and filling a balloon envelope in accordance with aspects of the present disclosure.

DETAILED DESCRIPTION

Figure 1:
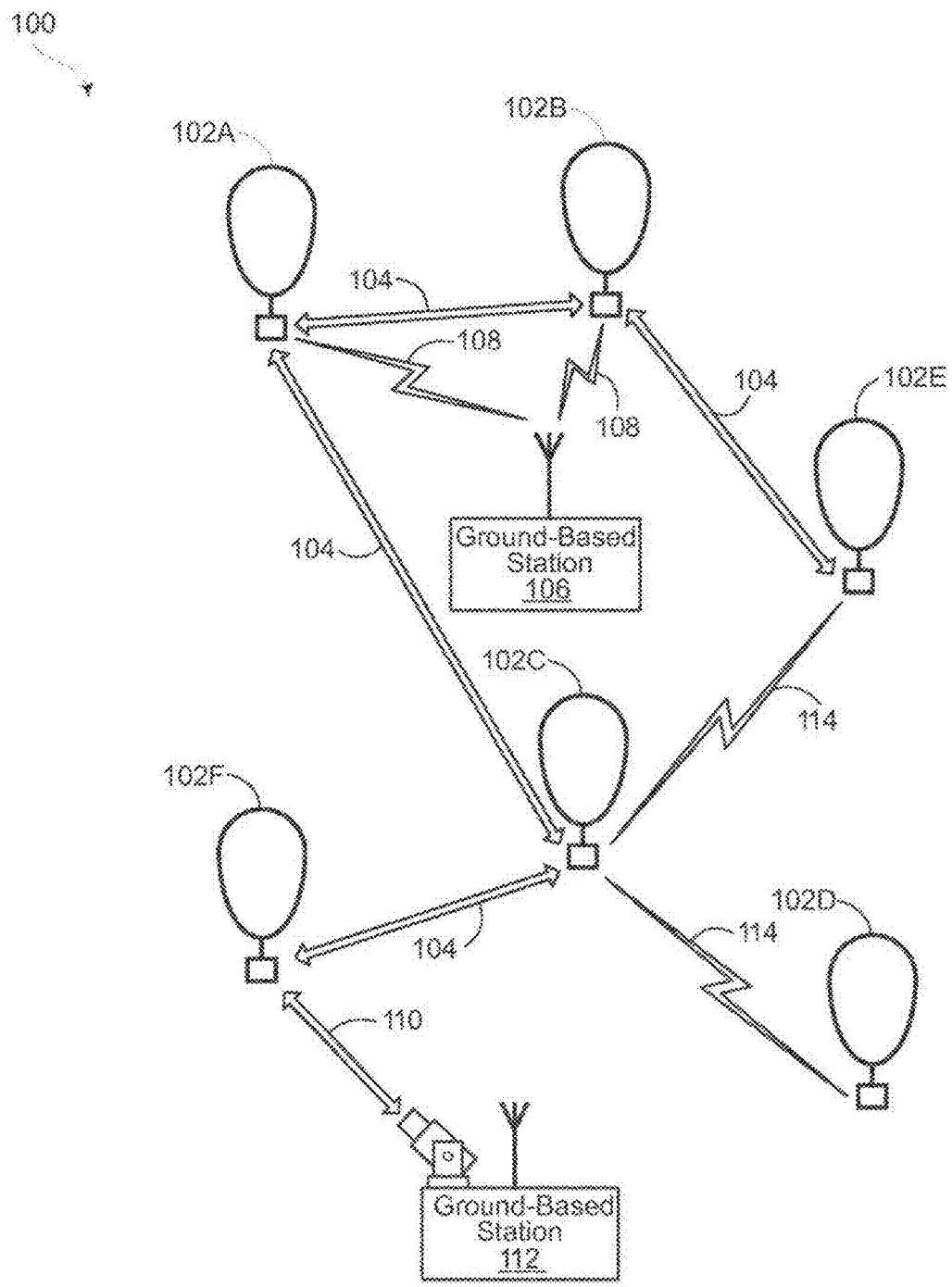
FIG. 1 is a functional diagram of a system in accordance with aspects of the present disclosure.

The present disclosure generally relates to proving apparatuses for lifting and filling high altitude balloons such as those used in communication networks. In some situations, these communication networks may include hundreds of thousands of balloons that are deployed in the stratosphere at the same time. Aspects described herein provide examples of apparatuses that may increase the overall efficiency in preparing such balloons for deployment.

In one embodiment, an apparatus for lifting and filling a high altitude balloon may include a load line having a fill tube nested within the load line. The fill tube may have a hollow portion that extends lengthwise through the load line. The load line may be configured to support a certain amount of load. For example, the load line may be able to support the weight of a balloon envelope in order to lift the envelope above the ground while the envelope is being inflated with lift gas. The fill tube may be configured to allow lift gas to pass through the hollow portion of the fill tube.

A termination member may be attached to the fill tube and load line. The termination member can be configured to mate with an opening in the envelope so that lift gas can pass through the hollow portion of the fill tube into the opening in the envelope. For example, the termination member may mate with a fill port attached to the opening in the balloon envelope. This matting may provide a temporary yet secure connection between the termination member and the fill port so that little or no lift gas can escape between.

To assist in locking the termination member to the fill port, the apparatus may further include one or more actuators. In one example, the one or more actuators may help to pull the fill tube and load line down onto the fill port. These actuators may then facilitate the connection by firmly clamping the termination member and fill port together.

After filing the envelope, the apparatus may use a type of plugging device to prevent lift gas from escaping the envelope. For example, the plugging device may prevent lift gas from escaping by closing or otherwise sealing the opening in the envelope. In one example, a plugging device may include a UV cured epoxy injected through the hollow portion of the fill tube that is subsequently hardened in order to close the opening. In another example, a plugging device may include a fill diffuser disposed within the opening in the balloon envelope. This fill diffuser can be configured both as a diffuser during filling of the balloon envelope with lift gas and as a hermetically sealed plug thereafter.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

Example System

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 220, may be disposed at a base or bottom of the balloon envelope 210. The top cap 201 at the apex may be the same size and shape as and bottom cap 220 at the bottom. Both caps include corresponding components for attaching the tendons 230, 240 and 250 to the balloon envelope 210.

Example Apparatus

As noted above, one aspect of the present disclosure provides an apparatus for lifting and a high altitude loon, such as balloon envelope 210 as described above. In FIGS. 3A-3B, cut-away side views of an apparatus 300 is shown. As shown in FIG. 3A, apparatus 300 may include a load line 302, a fill tube 304 having a hollow portion 305 nested within the load line 302 and a termination member 306 attached to the load line 302 and fill tube 304. The apparatus 300 may be used to lift and fill the envelope 210 with lift gas in order to prepare the balloon for deployment.

Load line 302 may be in the form of a cable that can be configured to lift the balloon envelope during inflation. For example, the load line 302 may be coupled to a lifting device such as a crane, forklift, winch, pulley assembly, etc. (not shown) capable of lifting the balloon envelope 210 high enough for the envelope 210 to be inflated. In that regard, the load line 302 may be of a material strong enough to be used to raise and hold balloon envelope 210 off of the ground, such as a type of metal fiber.

An inner portion of the load line 302 may include a fill tube 304 having a hollow portion 305. The fill tube 304 may be configured to allow lift gas to pass through the hollow portion 305 and into the envelope 210. The hollow portion 305 may thus define a flow channel that extends longitudinally through the load line 302 in order to allow the lift gas to reach an inner portion of the envelope 210 as shown in FIG. 3B.

In some embodiments, the termination member 306 may define an end section such as a particular end of apparatus 300. For example, one end of the apparatus 300 may be coupled to a lift gas fill source in order to fill the envelope 210 with lift gas and the other end of the apparatus 300 may include the termination member 306. In some aspects, this termination member 306 may be used for attaching the apparatus 300 to the balloon in order to help lift and fill the balloon envelope 210.

In FIG. 3B, apparatus 300 is shown positioned relative to a preconfigured opening 307 in balloon envelope 210. In some embodiments, the opening 307 may be created in several ways, such as at the time the balloon envelope 210 is manufactured, by cutting the envelope 210 material using any conventional cutting device, or by using various other techniques.

The hollow portion 305 of fill tube 304 may be sized so as to facilitate the flow of lift gas through the opening 307. For example, the opening 307 and hollow portion 305 may both be of a complimentarily shape and size to help prevent lift gas from escaping when the balloon envelope is being inflated.

The termination member 306 of apparatus 300 may be configured to mate with the preconfigured opening 307 in the balloon envelope 210. This may allow the lift gas to more easily pass through the hollow portion 305 of the fill tube 304 and into the opening 307 in the balloon envelope 210. In some examples, mating of the termination member 306 to balloon envelope 210 may include coupling the member 306 to a fill port 309 attached to the opening 307. Further aspects of this coupling are discussed below with respect to FIG. 4.

In FIG. 4, another cut-away side view of the apparatus 300 of FIGS. 3A-3B is shown. In this example, the apparatus 300 includes one or more actuators 402 and 404 coupled to the termination member 306. The actuators 402 and 404 may be configured to temporarily hold or otherwise secure the termination member 306 to the opening 307 in balloon envelope 210. Examples of some types of actuators may include magnetic members, servo, hydraulics, motorized double-CAM locks, etc.

In some examples, the actuators 402 may make contact with the fill port 309 attached to opening 307 in the envelope 210 in order to initiate a linking mechanism (not shown). This linking mechanism can be used to tightly secure the apparatus 300 to the envelope 210 so that very little to no lift gas can escape between them. An example of this type of linking mechanism is further discussed below.

FIGS. 5A-5C are cut-away side views 500 of another example of an apparatus 501. In this example, steps for securing the apparatus 501 to an opening 307 in balloon envelope 210 are shown. Apparatus 501 may be compared to apparatus 300 of FIGS. 3A-3B discussed above. For example, apparatus 501 includes a load line 502 (which may be compared to load line 302), a fill tube 504 (which may be compared to fill tube 304) having hollow portion nested within the load line 502 and a termination member 506 (which may be compared to termination member 306) attached to the load line 502 and fill tube 504.

As shown, the apparatus 501 may include one or more of magnets 507 attached to termination member 506 and a linking mechanism that may include one or more arm portions 505 and 507, here two, movably fixed to the apparatus 501. The magnets 507 may be used to temporarily hold the apparatus 501 to the opening 307 in balloon envelope 210 while the arm portions 505 and 507 may be used to tightly secure the apparatus 501 and opening 307 together.

With regards to FIG. 5A, the apparatus 501 is shown at a first position with respect to the opening 307 in balloon envelope 210. For example, the apparatus 501 may be positioned so that the termination member 506 is oriented towards a fill port 509 at the opening 307. At this point, the linking mechanism may be in an open position in that the arm portions 505 and 507 may be placed away from the termination member 506. This initial placement of the arm portions 505 and 507 may help when the termination member 506 is mated with the opening 307 by ensuring that the arm portions 505 and 507 do not get in the way.

Turning to FIG. 5B, the apparatus 501 is shown at a second position with respect to the opening 509. For example, the apparatus 501 may be positioned so that the magnets 507 attached to termination member 506 make contact with a metal portion of the fill port 509. As noted above, the magnets 507 may be used to temporarily hold the apparatus 501 to the opening 307 in balloon envelope 210. An advantage of using the magnets 507 is that they may help in aligning the fill tube 502 of apparatus 501 with the opening 307 in the envelope 210

In FIG. 5C, the apparatus 501 is shown at a third position with respect to the opening 509. As shown, the apparatus 501 has been moved toward or pulled down onto the fill port 509. For example, the arm portions 505 and 507 of the linking mechanism may pivot in order to make contact with the fill port 509. Another pivot movement of the arm portions 505 and 507 may then pull the termination member 506 and the fill port 509 tightly together. This may allow the termination member 506 and the fill port 509 to be firmly clamped to one another and help prevent lift gas from escaping the balloon envelope 210 from between the termination member and the fill port when the balloon envelope is being inflated. Once the apparatus 501 is secured to the opening 307, inflation of the balloon envelope 210 may begin.

To detach the apparatus 501 from the balloon envelope 210, the steps described above may be executed in reverse order. For example, the arm portions 505 and 507 of the linking mechanism may again pivot so that the arms no longer make contact with the fill port 509. Thereupon, the termination member 506 can be detached from the opening 307 in balloon envelope 210. At this point, the apparatus 501 may be pulled away so that the balloon can be deployed.

In some embodiments, when filling of the balloon envelope 210 is complete, the opening 509 must first be closed before the balloon can be deployed. Various plugging techniques can be used for closing this opening 307. For example, these techniques may include using a plugging device that can be attached to the opening 307 in the balloon envelope 210. The plugging device may be used to regulate a flow of lift gas through the opening 307. In some example, the plugging device may be configured so that it can be used in conjunction with the apparatus for lifting and filling the balloon envelope 210 as described herein. An advantage of this is that the plugging device can be used to close the balloon envelope 210 after the envelope 210 is inflated without having to withdraw the apparatus from the opening 307. This may also help prevent lift gas from escaping the balloon envelope 210 back through the opening 307 once the envelope 210 has been filled with a desired amount of lift gas.

FIGS. 6A-6B are examples of a plugging technique 600, which may be used to close the opening 307 in the envelope 210. As shown in FIG. 6A, the plugging technique 600 may include an epoxy 602 that can be injected into the opening 307. For example, the epoxy 602 may be injected through the fill tube 504 of apparatus 500 by using, for example, tube 601. In that regard, the tube 601 may be of a sufficient length that is capable of being inserted at one end of the apparatus 501 in order to reach the other end of the apparatus 501 where the termination member 506 is coupled to the opening 307 in the envelope 210

In FIG. 6B, the epoxy 604 is shown hardened. This hardening of the epoxy 604 may close the opening 307, and thus help prevent lift gas from escaping the balloon envelope 210. In some examples, to activate hardening of the epoxy 604, a light source 605 (e.g., a UV light source) may be fed though the fill tube 504 of the apparatus 501. The light source 605 may be configured to cause the epoxy 604 to cure or harden when the source 605 is in proximity of the epoxy 604. Various types of epoxies, glues, adhesives or resins that may be cured using various different techniques, such as by using hot or cold temperatures, can be used to close the opening 307.

FIGS. 7A-7B are another example of a plugging technique 700. In this example, the plugging technique 700 includes a gasket 702 attached to opening 307 in the balloon envelope 210. This gasket 702 may operate as a fill diffuser that can act both as a diffuser during inflation and then as a hermetically or completely sealed plug thereafter. In some embodiments, the gasket 702 may be configured to move from a first position to a second position depending on a direction of the flow of lift gas moving through opening 307.

As shown in FIG. 7A, the gasket 702 is in a first position (e.g., an open position) that may allow lift gas to enter the opening 307 in the envelope 210. For example, as lift gas is fed through apparatus 501, this gas may pass through the gasket 702 and into the opening 307 in order to enter an interior of the balloon envelope 210.

As shown in FIG. 7B, the gasket 702 is in a second position (e.g., a closed position) that may prevent the lift gas from escaping through the opening 307 in the balloon envelope 210. For example, when the flow of lift gas stops, the gasket 702 may automatically move to the second position. In this regard, the pressure of the lift gas from within the balloon envelope 210 may cause the gasket 702 to close, thereby sealing the opening 307 in the envelope 210.

Figure 8B:
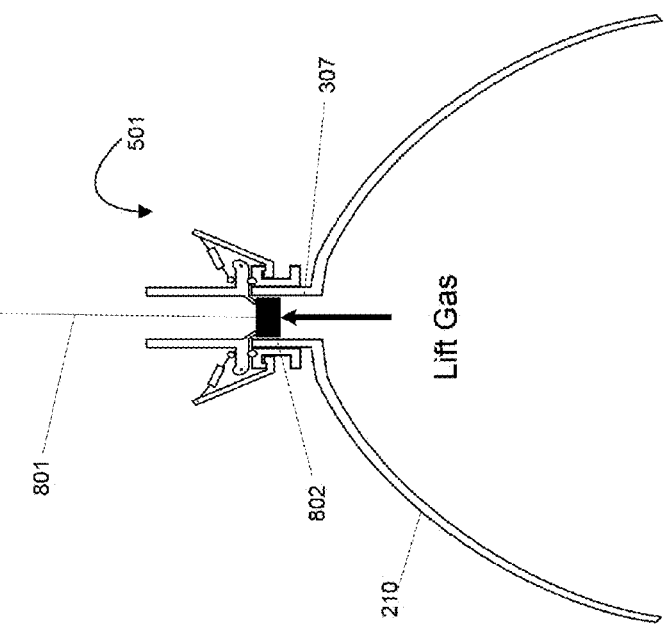
FIGS. 8A-8B are yet another example of a plugging technique in accordance with aspects of the present disclosure.
Figure 8A:
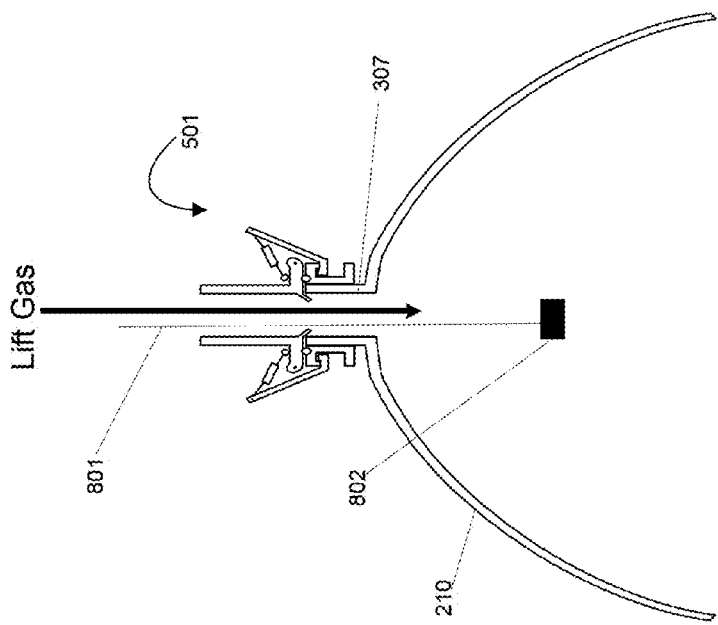

FIGS. 8A-8B are yet another example of a plugging technique 800. In this example, the plugging technique 800 may include a plug 802 disposed within balloon envelope 210 and a feed line 801 attached to the plug 802. The plug 802 may be constructed of an airtight material, such as rubber, that may be capable of closing the opening 307 in the envelope 210. In this regard, the plug 802 may be sized so that it can not pass through the opening 307.

As shown in FIG. 8A, the feed line 801 may be of a sufficient length and disposed through the apparatus 500 so as to reach the plug 802. While the plug is away from opening 307, the balloon envelope 210 can be filled with lift gas. After inflation is complete, the plug 802 can be used to close the opening 307.

As shown in FIG. 8B, the plug 802 is positioned at the opening 307 which may prevent lift gas from escaping. To close the opening with the plug 802, the feed line 801 may be withdrawn away the balloon envelope 210, which in turn, may move the plug 802 towards the opening 307. As the feed line 801 is withdrawn further, the plug 802 may move more towards the opening 307 until the plug 802 becomes lodged within the opening 307, thereby closing the balloon envelope 210. Once the balloon envelope 210 is inflated and the opening 307 is closed, the balloon may be completed.

FIGS. 9A-9C depicts an example 900 of an apparatus 901 lifting and filing balloon envelope 210 is shown. Apparatus 901 may be compared to apparatus 300 of FIGS. 3A-3B and apparatus 501 or FIG. 5 discussed above. For example, apparatus 901 includes a load line 902 (which may be compared to load lines 302 and 502), a fill tube 904 (which may be compared to fill tubes 304 and 504) having hollow portion nested within the load line 902 and a termination member 906 (which may be compared to termination members 306 and 506) attached to the load line 902 and fill tube 904. As shown, the apparatus 901 may be attached to an apex of the balloon envelope 210 via the termination member 906.

In FIG. 9A, the balloon envelope 210 is shown coming out of a box 930, such as a shipping box for the balloon envelope 210. In this example, a hoisting device (not shown) and lift gas fill source (not shown) may be coupled to apparatus 901 and used to pull the balloon envelope 210 upward while the balloon being inflated.

In FIG. 9B, the apparatus 901 is shown with the balloon envelope 210 even higher out of the box 930 and partially inflated. For example, as the balloon envelope 210 is lifted, a flow of lift gas from the lift gas fill source may pass through the apparatus 901 to start inflation of the envelope 201.

In FIG. 9C, the balloon envelope 210 is shown at another height. For example, this may be a height high enough to accommodate the fully inflated balloon envelope 210. Once the balloon envelope 210 is inflated, the opening in the envelope may be closed, for example, by using any one of the plugging techniques described above and the apparatus 901 may be detached from the envelope 210 so that the balloon can be deployed.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An apparatus for use with a balloon envelope, the apparatus comprising:
    a load line, the load line being configured to lift the balloon envelope during inflation;
    a fill tube having a hollow portion nested within the load line, the fill tube extending through the load line and being configured to allow lift gas to pass through the hollow portion; and
    a termination member attached to the load line and fill tube, the termination member being configured to mate with an opening in the balloon envelope so that lift gas can pass through the hollow portion of the fill tube and into the opening in the balloon envelope.

2. The apparatus of claim 1, further comprising one or more actuators coupled to the termination member, the one or more actuators are configured to temporarily hold the termination member and the opening in the balloon envelope together.

3. The apparatus of claim 2, wherein the one or more actuators includes at least one of a magnet, servo, hydraulic and motorized double-CAM lock.

4. The apparatus of claim 2, wherein the one or more actuators includes an arm portion configured to pull the termination member onto the opening in the balloon envelope in order to firmly secure the termination member and the opening together.

5. The apparatus of claim 1, further comprising a plugging device attached to the opening in the balloon envelope, the plugging device is configured to regulate a flow of lift gas through the opening.

6. The apparatus of claim 5, wherein the plugging device includes a gasket configured to move from a first position to allow lift gas to enter the opening in the balloon envelope and second position to prevent the lift gas from escaping through the opening in the balloon envelope.

7. The apparatus of claim 5, wherein the plugging device includes an epoxy injected through the hollow portion of the fill tube.

8. The apparatus of claim 7, wherein the epoxy is configured to harden in order to close the opening in the balloon envelope.

9. The apparatus of claim 8, further comprising a light source disposed through the hollow portion of the fill tube, the light source is configured to activate hardening of the epoxy.

10. The apparatus of claim 5, wherein the plugging device includes a plug configured to close the opening in the balloon envelope.

11. A system, comprising:
a balloon having a balloon envelope; and
an apparatus for use with the balloon envelope, the apparatus comprising
a load line, the load line being configured to lift the balloon envelope during inflation;
a fill tube having a hollow portion nested within the load line, the fill tube extending through the load line and being configured to allow lift gas to pass through the hollow portion; and
a termination member attached to the load line and fill tube, the termination member being configured to mate with an opening in the balloon envelope so that lift gas can pass through the hollow portion of the fill tube and into the opening in the balloon envelope.

12. The system of claim 11, further comprising one or more actuators coupled to the termination member, the one or more actuators is configured to temporarily hold the termination member and the opening in the balloon envelope together.

13. The system of claim 12, wherein the one or more actuators includes at least one of a magnet, servo, hydraulic and motorized double-CAM lock.

14. The system of claim 12, wherein the one or more actuators includes an arm portion configured to pull the termination member onto the opening in the balloon envelope in order to firmly secure the termination member and the opening together.

15. The system of claim 11, further comprising a plugging device attached to the opening in the balloon envelope, the plugging device is configured to regulate a flow of lift gas through the opening.

16. The system of claim 15, wherein the plugging device includes a gasket configured to move from a first position to allow lift gas to enter the opening in the balloon envelope and second position to prevent the lift gas from escaping through the opening in the balloon envelope.

17. The system of claim 15, wherein the plugging device includes an epoxy injected through the hollow portion of the fill tube.

18. The system of claim 17, wherein the epoxy is configured to harden in order to close the opening in the balloon envelope.

19. The system of claim 18, further comprising a light source disposed through the hollow portion of the fill tube, the light source is configured to activate hardening of the epoxy.

20. The system of claim 15, wherein the plugging device includes a plug configured to close the opening in the balloon envelope.

* * * * *